July 14, 1931. J. D. DUUCK 1,814,673
HOG FEEDER
Filed April 22, 1930 2 Sheets-Sheet 1
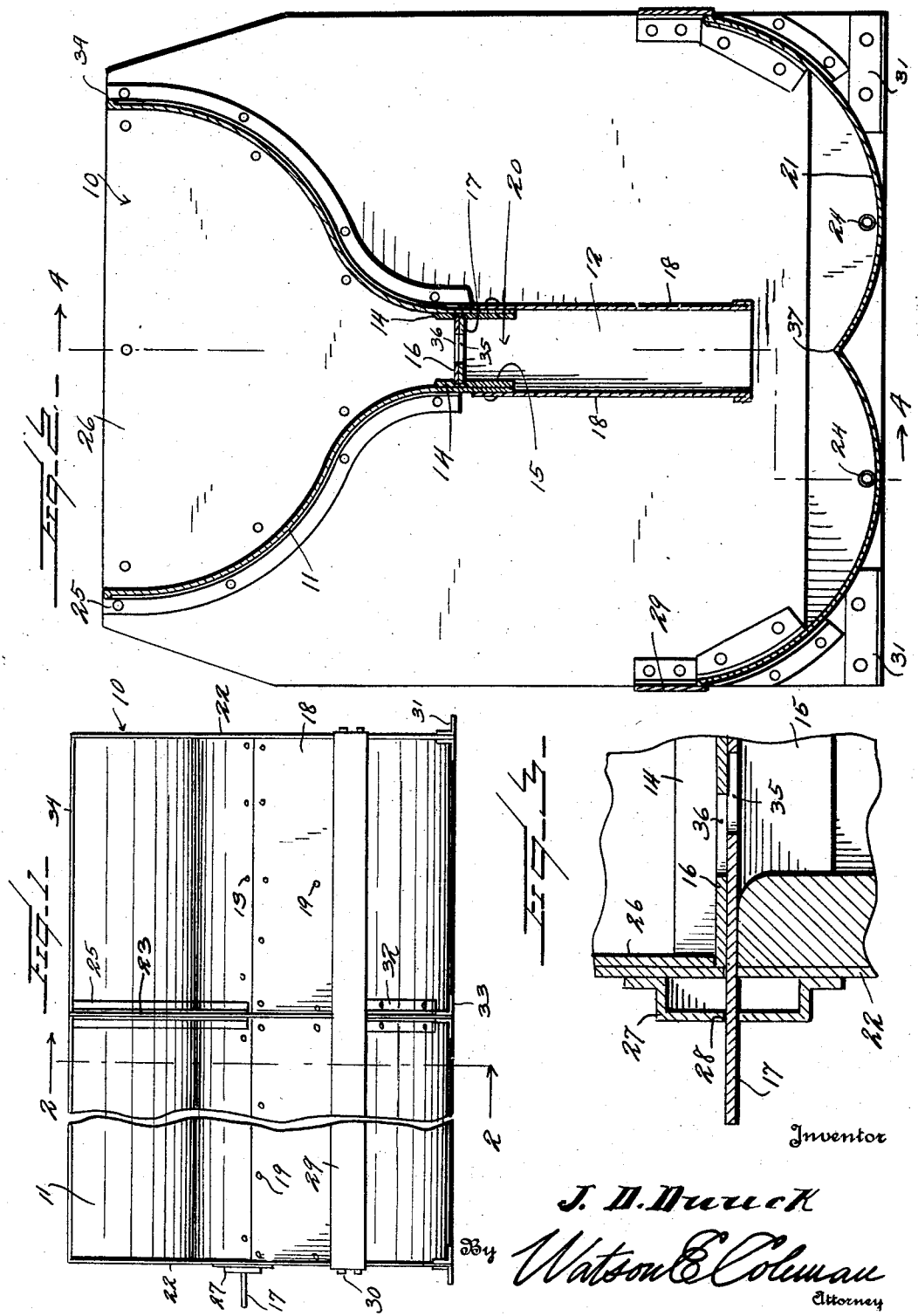

July 14, 1931.  J. D. DUUCK  1,814,673
HOG FEEDER
Filed April 22, 1930    2 Sheets-Sheet 2
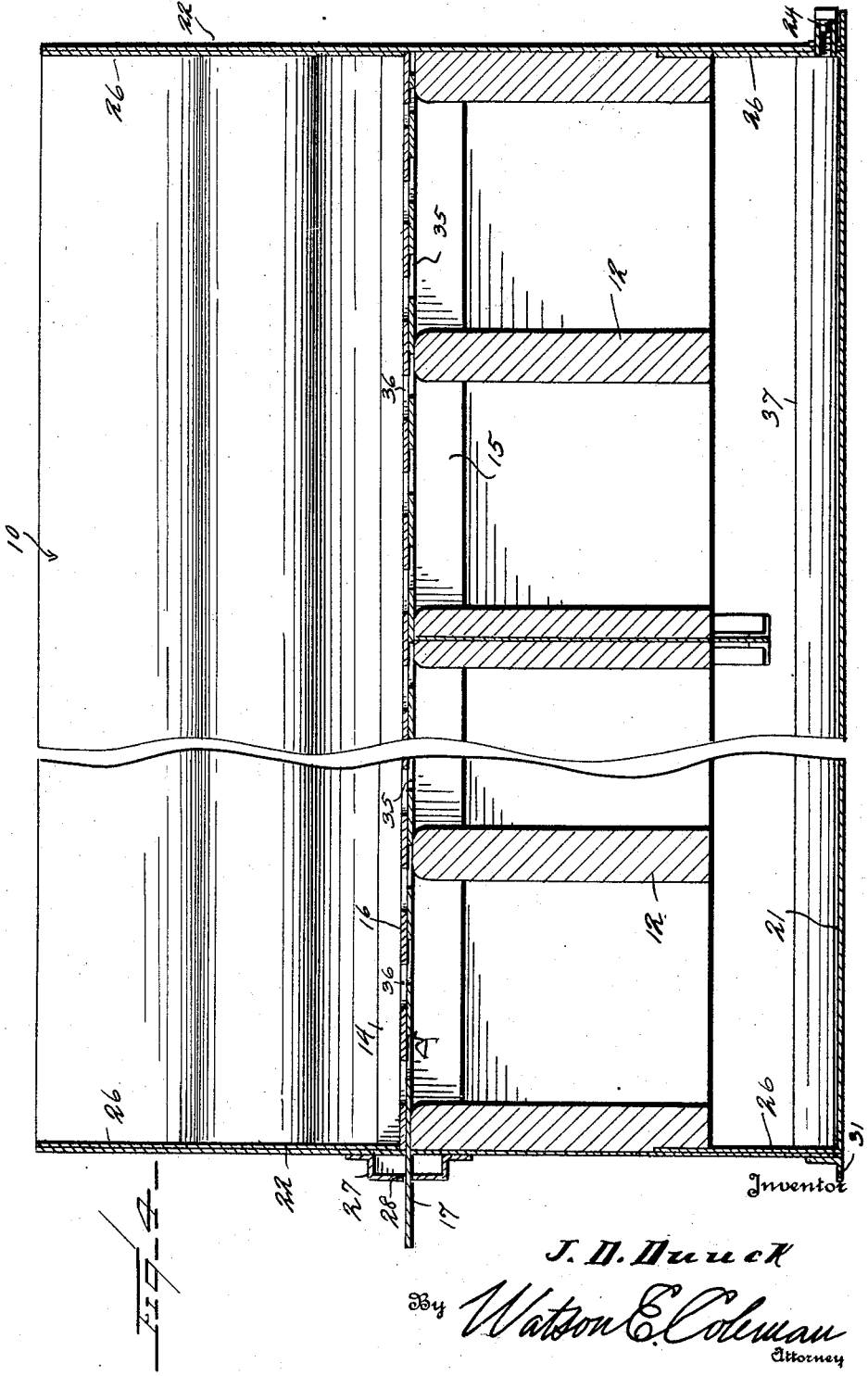

Patented July 14, 1931

1,814,673

UNITED STATES PATENT OFFICE

JOSIAS D. DUUCK, OF SEQUIM, WASHINGTON

HOG FEEDER

Application filed April 22, 1930. Serial No. 446,357.

This invention relates to hog feeders or the like and is an improvement in my pending application for hog feeders, Serial #256,780 filed February 24th, 1928.

An object of this invention is to provide a hog feeder having a reservoir, a feeding trough and guard members dependingly secured to the reservoir and integrally formed therewith.

Another object of this invention is to provide a feeding trough of this character which may be used for either dry or wet feed, the feed reservoir having removable bottom members by which either wet or dry feed may be placed in the feeding trough.

A further object of this invention is to provide a feeding trough with a guard plate so as to prevent the smaller animals from feeding from the trough.

The above and various other objects and advantages of this invention will in part be described in and in part be understood from the following detailed description of the present preferred embodiment, the same being illustrated in the accompanying drawings wherein:—

Figure 1 is a fragmentary detail side elevation of a feeder constructed according to the preferred embodiment of this invention;

Figure 2 is an enlarged sectional view taken on the line 2—2 of Figure 1;

Figure 3 is a fragmentary longitudinal sectional view of one end of the device; and Figure 4 is a fragmentary longitudinal sectional view taken on the line 4—4 of Figure 1.

Referring to the drawings wherein like numerals of reference designate corresponding parts throughout the several views, the numeral 10 designates a feed reservoir which is elongated and provided with opposite side members 11 which are inwardly curved and converging toward the center so as to provide a tapering bottom. The opposite side members 11 are held in spaced relation to each other by a plurality of depending partition members 12 which are spacedly positioned along the trough, and the lower end portion of the side members 11 may be secured to the partition members 12 by means of screws or bolts 13 or the like.

The opposite side members 11 and 12 are provided with a longitudinally disposed upper flange or guide member 14 and a lower flange or guide member 15 which is positioned on the side members 11 at a point spaced downwardly from the upper guide member 14 so as to removably receive a slotted bottom 16 and a slidable closure member 17. A pair of aprons or guard members 18 are secured to the partition members 12 by means of bolts, screws or the like 19, the guard members 18 depending downwardly from the nozzle portion 20 of the feeder.

If desired, the guard members 18 may be formed integrally with the side members 11 so as to provide an integral side and guard portion. The guard members 18 are dependingly secured to the side members 11 at substantially the central portion thereof and depend within a pair of feeding troughs 21 which are secured to the reservoir 10 by means of end members 22 and a central support 23.

The feeding troughs 21 may be provided at one end with a drain aperture 24 so as to drain any liquid or the like from the trough. The end members 22 and the partitioning or supporting member 23 may be secured to the upper and lower trough by means of an L shaped member 25 or the like or, if desired, the ends of the upper and lower troughs may be closed by end plates 26, and the end plates 26 secured by bolts or rivets to the end members 22. The slidable closure member 17 is adapted to be extended outwardly of one end of the feeder, and one end of the feeder is provided with a box or cap 27 which is provided with a slot or aperture 28 so as to slidably receive the outwardly extended portion of the closure member 17.

If desired, the slidable closure member 17 may be provided with operating means similar to that disclosed in my pending application, Serial #256,780 so as to move the closure member longitudinally within the feeding reservoir.

A guard plate 29 is adapted to be positioned along the outer edge portion of the feeding trough 21 and is secured to the end members 22 by means of bolts or rivets 30 or the like, the guard plate 29 being adapted to raise the outer edge of the feeding troughs so as to prevent small animals from feeding therefrom.

The end members 22 are provided with L shaped feet or supporting members 31, and a centrally disposed plate 32 is secured to the feeding troughs 21 and is provided at the lower end portion thereof with outwardly disposed feet 33 so as to support the central portion of the feeder and to maintain the feeding troughs 21 in spaced relation to the ground.

If desired the feed reservoir 10 may be provided along the opposite upper edge portions thereof with an outstanding beading 34 or the like, the beading 34 being preferably constructed integrally with the side portions 11 or, if desired, may be constructed in the form of a semi-circular or oval band which may be appropriately secured by rivets or the like to the upper edge of the reservoir.

In the operation of this device, where it is desired to use a wet feed, the closure member 17 may be moved longitudinally within the guide members 14 and 15 so as to move the apertures 35 into register with the apertures 36 in the removable bottom member 16. The feed will then be permitted to flow downwardly between the guard members 18 and will drop into the feeding troughs 21, the feeding troughs 21 being integrally formed and provided with a longitudinally disposed rib 37 which is positioned substantially centrally of the space between the two guard members 18 so that when the feed drops down between the guard members it will be disposed equally in each of the feeding troughs.

Where it is desired to place dry feed in the feeding troughs 21, the dry feed may be placed in the reservoir 10, and the slidable closure member 17 pulled outwardly of the guide members. When the slidable closure member 17 has been withdrawn the removable bottom 16 will drop upon the lower guide members 15 and may then be forced outwardly through the aperture 28, the aperture 28 being in alignment with the lower guide member 15. The dry feed in the reservoir 10 will then be permitted to drop downwardly into the feeding troughs 21.

In inserting the bottom member 16 and the closure member 17 in the guide members, the removable bottom 16 is first pushed inwardly through the aperture 28 and when it is pushed within the bottom portion of the reservoir 10 the forward end thereof may be lifted up slightly whereupon the slidable closure member 17 may be pushed inwardly through the aperture 28 whereupon the slidable closure member 17 will engage the bottom or lower portion of the removable member 16 and will force the removable bottom 16 upwardly as the closure member 17 is moved inwardly so that when wet feed is again placed in the reservoir 10 it will not leak or drip downwardly into the feeding trough until the slidable member 17 has been moved outwardly to a point where the apertures 35 register with the apertures 36 in the bottom 16.

It will, of course, be understood that various changes and modifications may be made in the details of construction and design of the specifically described embodiment of this invention without departing from the spirit thereof, such changes and modifications being restricted only by the scope of the following claims.

What is claimed is:—

1. A hog feeder of the character described comprising a feed reservoir, a feeding trough, guard means depending from said reservoir, a guide member secured to said reservoir, a removable apertured bottom member loosely positioned in said guide member, and a slidable apertured closure member loosely positioned in said guide member.

2. A hog feeder of the character described comprising a feed reservoir having a pair of converging side members, means for maintaining said side members in spaced relation to each other, a guard plate secured to the lower edge portion of said side members and integrally formed therewith, guide means secured to the inner face portions of said side members, a removable apertured bottom loosely mounted in said guide means, an apertured closure member slidably engaging said removable bottom and mounted in said guide means, a pair of feeding troughs, means for mounting said feeding troughs beneath said guard members, and an apertured cap secured to said reservoir, said closure member being adapted to extend outwardly of said reservoir through said cap.

3. A feeding trough of the character described comprising a feed reservoir, a pair of guard plates depending from said feed reservoir means for mounting said guard plates in spaced relation to each other, a pair of feeding troughs, end plates secured to said reservoir and said feeding troughs and adapted to maintain said feeding troughs and said reservoir in spaced relation to each other, a centrally disposed guide member secured to said reservoir, a removable apertured bottom positioned in said guide member, a slidable closure member slidably engaging said bottom and said guide member, an apertured track secured to one of said end plates, said closure member being adapted to extend outwardly through the aperture in said cap, a guard plate adapted to be secured to said end plates and positioned along the outer marginal edge portions of said feeding troughs whereby to prevent small animals from feeding from the trough, and means for securing said guard plate to the end plates.

4. A hog feeder of the character described comprising a feed reservoir, a pair of feed troughs, means for securing said feed reservoir in vertically disposed spaced relation to said feed troughs, said feed reservoir comprising a pair of elongated converging side plate members having depending guard plates on their lower edge portions and integrally formed therewith, each of said side members having a pair of spaced inwardly extending flanges whereby to provide a guide member, means for securing the inner edge portions of said side members in spaced relation to each other, a removable apertured bottom positioned in said guide member, and a movable apertured closure member positioned in said guide member and engaging said removable bottom.

In testimony whereof I hereunto affix my signature.

JOSIAS D. DUUCK.